US009649769B2

(12) United States Patent
Colin et al.

(10) Patent No.: US 9,649,769 B2
(45) Date of Patent: May 16, 2017

(54) DEVICE FOR HANDLING CASES CONTAINING OBJECTS

(71) Applicant: Areva NC, Courbevoie (FR)

(72) Inventors: Bruno Colin, Orange (FR); Luc Collette, Pont Saint Esprit (FR)

(73) Assignee: AREVA NC, Courbevoie (FR)

(*) Notice: Subject to any disclaimer, the term of this patent is extended or adjusted under 35 U.S.C. 154(b) by 131 days.

(21) Appl. No.: 14/414,238

(22) PCT Filed: Jul. 11, 2013

(86) PCT No.: PCT/EP2013/064691
§ 371 (c)(1),
(2) Date: Jan. 12, 2015

(87) PCT Pub. No.: WO2014/009476
PCT Pub. Date: Jan. 16, 2014

(65) Prior Publication Data
US 2015/0197013 A1    Jul. 16, 2015

(30) Foreign Application Priority Data

Jul. 13, 2012 (FR) ..................................... 12 56810

(51) Int. Cl.
*B25J 15/00*  (2006.01)
*G21F 7/04*   (2006.01)
(Continued)

(52) U.S. Cl.
CPC .......... *B25J 15/0028* (2013.01); *B25J 11/00* (2013.01); *B65G 65/38* (2013.01); *G21F 7/04* (2013.01);
(Continued)

(58) Field of Classification Search
CPC ....... B25J 15/0028; B25J 11/00; E21B 19/06; E21B 19/07; B66C 1/30; B66C 1/48;
(Continued)

(56) References Cited

U.S. PATENT DOCUMENTS 1,974,892 A * 9/1934 Poliakoff ................ B66C 1/442
                                                         294/106
2,106,373 A * 1/1938 Garriot ..................... B66C 1/48
                                                         294/102.1
(Continued)

FOREIGN PATENT DOCUMENTS

DE      4400354 A1 *  7/1995   ........... B23B 13/126
FR    2 682 902 A1     4/1993
(Continued)

OTHER PUBLICATIONS

Search Report issued in French Patent Application No. FR 12 56810 dated Jun. 20, 2013.
(Continued)

*Primary Examiner* — Glenn Myers
(74) *Attorney, Agent, or Firm* — Pearne & Gordon, LLP (57) ABSTRACT

The handling device for cases and boxes contained in the cases, comprising a housing intended to receive a case, said housing being closed at a first longitudinal end and open at a second longitudinal end, a holding device (14) mounted at the level of the second end of the housing, the latter comprising two clamping jaws, said clamping jaws applying a clamping force to the case (E), an actuator for opening and closing said jaws, two stop jaws (36, 38), each (36, 38) being supported by a clamping jaw and being articulated in a free manner about and relative to the clamping jaw, springs (40) connecting said stop jaws (36, 38), such that opening of the
(Continued)

clamping jaws causes opening of the stop jaws (36, 38) and the stop jaws (36, 38) can be opened independently of the clamping jaws.

23 Claims, 5 Drawing Sheets

(51) Int. Cl.
    *B25J 11/00*     (2006.01)
    *B65G 65/38*     (2006.01)
    *G21F 7/06*     (2006.01)
    *B65B 69/00*     (2006.01)

(52) U.S. Cl.
    CPC ............ *G21F 7/06* (2013.01); *B65B 69/0033* (2013.01); *G21F 7/061* (2013.01)

(58) Field of Classification Search
    CPC ..... B66C 1/442; B66C 1/101; B65B 69/0033; B65B 69/0008; B65B 69/0025; B65B 43/46; B25B 9/04; B23Q 7/043; G21C 19/20; G21C 19/105; G21F 7/047; G21F 7/061; G21F 7/062; G21F 7/067; G21F 7/06; G21F 7/04
    See application file for complete search history.

(56) References Cited

U.S. PATENT DOCUMENTS

| | | | | |
|---|---|---|---|---|
| 3,040,921 A | * | 6/1962 | Davis | B66C 1/04 294/106 |
| 3,771,826 A | * | 11/1973 | Merola | B23Q 7/043 294/102.1 |
| 3,941,413 A | * | 3/1976 | Johnson | G21C 7/12 294/205 |
| 6,331,025 B1 | * | 12/2001 | Douglas | B66C 1/442 294/110.1 |
| 2007/0080549 A1 | * | 4/2007 | Jenney | B66C 1/10 294/81.3 |
| 2008/0101895 A1 | * | 5/2008 | Holcomb | B25J 15/0226 414/226.02 |
| 2011/0266409 A1 | * | 11/2011 | Warrick | A61J 1/16 248/316.5 |
| 2013/0167972 A1 | | 7/2013 | Peressoni | |
| 2014/0369790 A1 | | 12/2014 | Duval | |

FOREIGN PATENT DOCUMENTS

| | | | | |
|---|---|---|---|---|
| FR | 2 964 091 A1 | | 3/2012 | |
| JP | 2009-047668 A | | 3/2009 | |
| NL | WO 0230804 A1 | * | 4/2002 | ............... B66C 1/32 |

OTHER PUBLICATIONS

International Search Report issued in Application No. PCT/EP2013/064691 dated Aug. 9, 2013.
Written Opinion issued in Application No. PCT/EP2013/064691 dated Aug. 9, 2013.
U.S. Appl. No. 14/402,484, "Storage Device" filed Nov. 20, 2014.

* cited by examiner

DEVICE FOR HANDLING CASES CONTAINING OBJECTS

TECHNICAL FIELD AND PRIOR ART

The present invention relates to a handling device of cases containing objects; for example, these can be cases containing boxes filled with materials designed for manufacture of nuclear fuel.

Some materials involved in the manufacture of nuclear fuel, such as MOX, are transported in boxes sealed closed arranged inside cases in turn sealed closed.

For example, in the case of the manufacture of MOX fuel, plutonium oxide is recovered after reprocessing of spent fuel, and is stored in metal boxes closed in a sealed manner, these boxes being stacked in a case also made of metal and sealed closed. These cases are transported from reprocessing facilities for spent nuclear fuel to MOX fuel manufacturing facilities.

When this case arrives at the MOX fuel manufacturing installation, the latter is opened and the boxes of plutonium oxide are unloaded for use of plutonium oxide.

Opening the case and handling the boxes of plutonium is done in a glove box by means of robots which can be controlled from outside the glove box. As a consequence, the device or devices handling the cases and the boxes must be of robust construction and reliable to reduce the number of incidents and avoid maintenance which is complex and generally takes a long time to carry out in a glove box. In addition, the boxes must be handled carefully to prevent being damaged, which could cause leakage of the material they contain or impede their handling throughout installation, for example for their opening and/or their storage.

EXPLANATION OF THE INVENTION

It is consequently an aim of the present invention to provide a handling device of a case containing objects for opening of the case and extraction of the boxes contained in this case one by one, the device being simple to produce and robust and ensuring secure handling of the cases and boxes.

The above aim is attained by a handling device comprising a housing intended to receive the case, this housing being closed at an end and at the other end comprising holding means of the case, these means comprising two jaws intended to clamp the case, these means also comprising two jaws forming a stop for the boxes contained in the case when the case is open. These jaws are mounted in a free manner on the clamping jaws of the case and are brought back together by resilient means such that, on opening of the clamping jaws the stop jaws are also opened and such that the stop jaws can be opened independently of the clamping jaws.

Very advantageously, these stop jaws cooperate with a device for retrieval of boxes when they are evacuated from the case, this device for retrieval comprising fingers intended to cooperate with the stop jaws to move them apart and enable passage of boxes while the case is held clamped by the clamping jaws. The boxes are extracted from the case and received by the device for retrieval.

Very advantageously, evacuation of the boxes is carried out by gravity.

Preferably, the housing is arranged in a wheel rotatably mounted about its axis, the housing extending along a diameter of the wheel, the rotation of the wheel enabling the case to reach different stations where it undergoes different operations.

The subject-matter of the present invention is a handling device for cases and boxes contained in the cases, the cases being of cylindrical form, said device comprising a housing of longitudinal axis intended to receive a case, said housing being closed at a first longitudinal end and open at a second longitudinal end, a holding device mounted at the level of the second end of the housing, said holding device comprising two clamping jaws capable of being moved about an axis orthogonal to the longitudinal axis of the housing, said clamping jaws being intended to apply a clamping force to the case so as to hold it longitudinally in the housing, at least one actuator for opening and closing said clamping jaws, two stop jaws, each being supported by a clamping jaw and being articulated in a free manner about the axis of rotation of the clamping jaw, said stop jaws being brought back together in a stop position by resilient means, such that opening of the clamping jaws causes opening of the stop jaws and such that the stop jaws can be opened independently of the clamping jaws.

The device can comprise a wheel rotatably mounted about its axis, said housing being arranged in said wheel and extending along a diameter of said wheel.

One of the clamping jaws can comprise a shoulder forming a longitudinal stop for the case. The other clamping jaw can comprise a face inclined relative to the axis of the housing towards the exterior of the housing.

Advantageously, at least one of the stop jaws comprises a roller free in rotation bordering the passage delimited by the two stop jaws so as to make it easy for the object contained in the case to exit.

In an embodiment, each stop jaw comprises opening faces on either side of the passage delimited by the two stop jaws, said opening faces of a stop jaw being opposite the opening faces of the other stop jaw, said opening faces being intended to cooperate each with ramps supported by a device for opening.

Advantageously, the opening faces each comprise a roller free in rotation cooperating with one of said ramps.

Preferably, the handling device comprises at least one sensor for measuring the position of the stop jaws.

Very advantageously, the device comprises a single sensor measuring the relative position of the stop jaws, said sensor being supported by an arm secured in movement with one of the jaws and being sensitive to displacement of another arm secured in movement with the other stop jaw.

The device can comprise an actuator for rotatably moving one of the clamping jaws and transmission means for transmitting movement to the other clamping jaw so as to cause distancing or closing in of the clamping jaws.

For example, the clamping jaws comprise two lateral flanges articulated on a frame of the handling device, and in which the transmission means are formed by teeth supported by each lateral flange, said lateral flanges comprising teeth meshing such that rotation in one direction of one of the clamping jaws causes rotation in a direction opposite the other clamping jaw.

The resilient means bringing the stop jaws closely together can comprise two helicoidal springs arranged on either side of the longitudinal axis of the housing, each helicoidal spring being fixed by one end to a stop jaw and by another end to the other stop jaw. Advantageously, the device comprises adjustment means of the tension of the springs.

The handling device can comprise a device for displacement of the case along the longitudinal axis of the housing arranged in the housing.

Another subject-matter of the present invention is an installation for handling a case and boxes contained in the case, comprising a handling device according to the invention, a device for opening cases to separate a case head from a case body and making the objects contained in the case accessible, and a device for extraction and retrieval of the objects contained in the cases.

For example, the device for opening cases and the device for extraction and retrieval of the objects contained in the cases are arranged about a wheel.

In an embodiment, the device for opening cases is a cutting device arranged above the wheel and the device for extraction and retrieval is arranged below the wheel such that the extraction of the objects from the body of the case is achieved by gravity.

During extraction of objects, the longitudinal axis of the housing is preferably oriented at an angle of 45° relative to a horizontal direction.

The extraction and recuperation device can comprise an arm of longitudinal axis displaceable at least in rotation about an axis parallel to the axis of the wheel, a trolley movably mounted in translation on the arm along the longitudinal axis of the arm, a housing supported by the trolley intended to receive an object contained in the case, and opening means of the stop jaws.

The opening means of the stop jaws comprise for example four fingers supported by the trolley and bordering the housing, said fingers being oriented parallel to the longitudinal axis of the arm and each being fitted at a free end with a ramp intended to cooperate with the stop jaws such that when the fingers are inserted between the stop jaws, the latter move away from each other.

Advantageously, the trolley comprises detection means of the presence of the object.

The installation can comprise a device for retrieval of the empty case, arranged under the wheel such that evacuation of the empty case body is achieved by gravity and a device for retrieval of case heads.

It can be provided advantageously that, when the objects are boxes containing plutonium oxide, installation is confined to a glove box.

BRIEF DESCRIPTION OF DRAWINGS

The present invention will be more clearly understood by means of the following description and the appended drawings, in which.

DETAILED EXPLANATION OF PARTICULAR EMBODIMENTS

In the following description, the handling device of cases and the installation comprising such a device will be described in relation to a case comprising boxes filled with plutonium oxide. However, it will be understood that this is one embodiment, and that this handling device can be applied to objects other than boxes containing plutonium oxide, whether in the nuclear field or another field.

Figure 1:
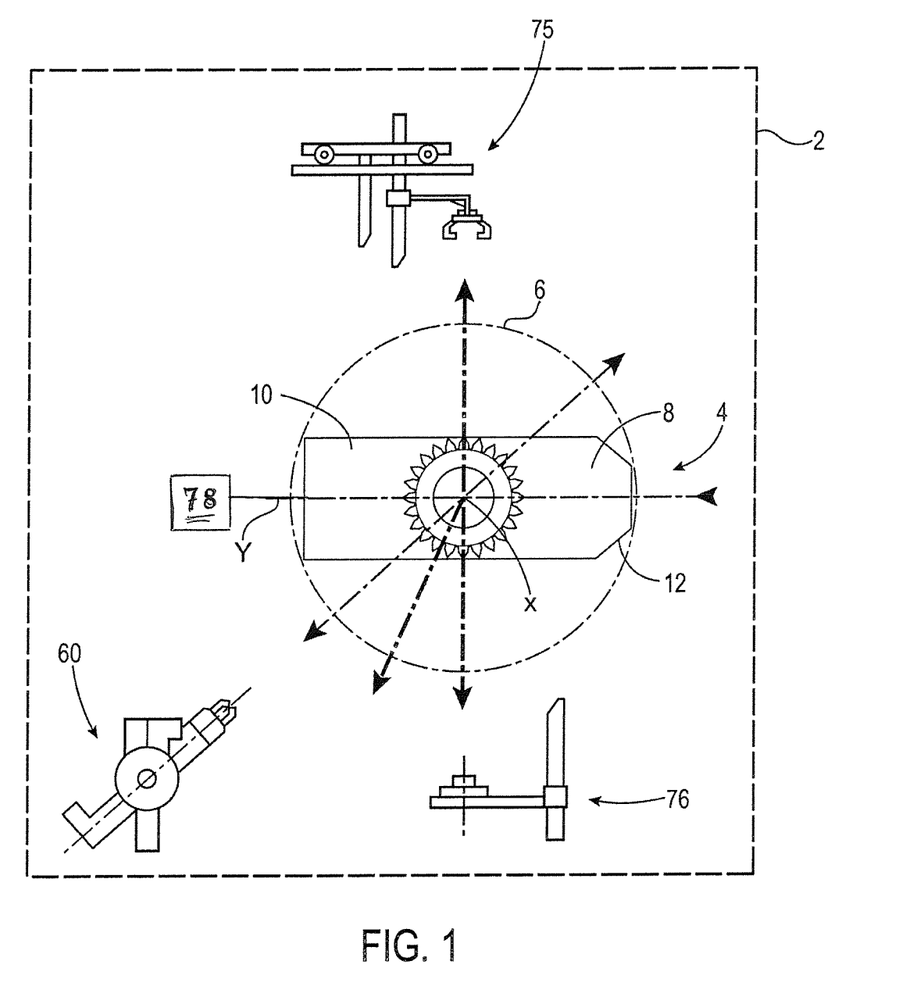
FIG. 1 is a schematic representation of a complete handling installation of the case and boxes contained in this case.

FIG. 1 shows a schematic representation of an installation for handling and managing cases containing boxes filled with plutonium oxide. In the example illustrated, the case has a tubular form.

The cases E containing the boxes B of plutonium oxide are transported between the reprocessing facilities and the nuclear fuel manufacturing facilities in containers. When they arrive at the nuclear fuel manufacturing facilities, each case is taken out individually from the container and is introduced into a first glove box for introduction then to a second glove box comprising the installation shown in FIG. 1. This second glove box is symbolised by a frame in dashed lines and is designated by its reference 2.

The cases are placed individually into the glove box 2 to be loaded in the handling device 4 horizontally; the cases are again sealed closed when they are loaded inside the handling device 4.

In the example shown and advantageously, the handling device comprises a wheel 6 rotatably mounted about its axis X, this axis being horizontal and being perpendicular to the plane of the sheet in the representation of FIG. 1.

The wheel 6 is capable of pivoting its axis X so as to assume different positions, as per case undergoing different operations at the level of these positions. Rotation of the wheel is ensured for example by an electric motor (not shown).

The wheel 6 comprises a housing 8 of axis Y extending diametrically into the wheel. The housing 8 comprises a first longitudinal closed end 10 and a second longitudinal open end 12 via which the cases are introduced. When the case is arranged in the housing 8, its longitudinal axis extends parallel to the axis Y of the housing.

The second end 12 is equipped with a holding device of the case and for holding boxes when the case is open. This device will be designated hereinbelow as <<holding device>> and designated by its reference 14. As a variant, the case housing 6 could be supported by an arm which would set the housing in rotation and in translation.

Figure 2:
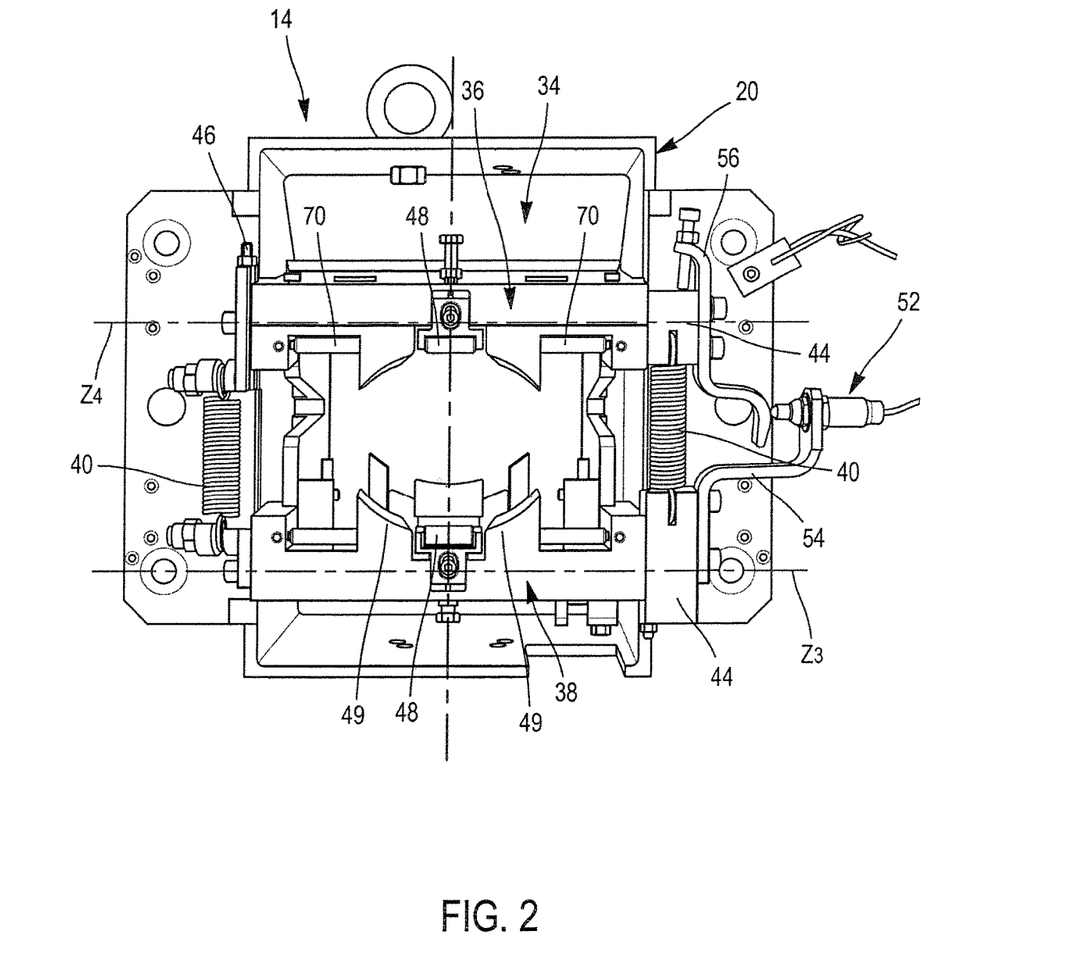
FIG. 2 is a front view of a case holding device also forming a stop for the boxes contained in a case, the device being implemented in the installation of FIG. 1, the case and the boxes not being shown.
Figure 3:
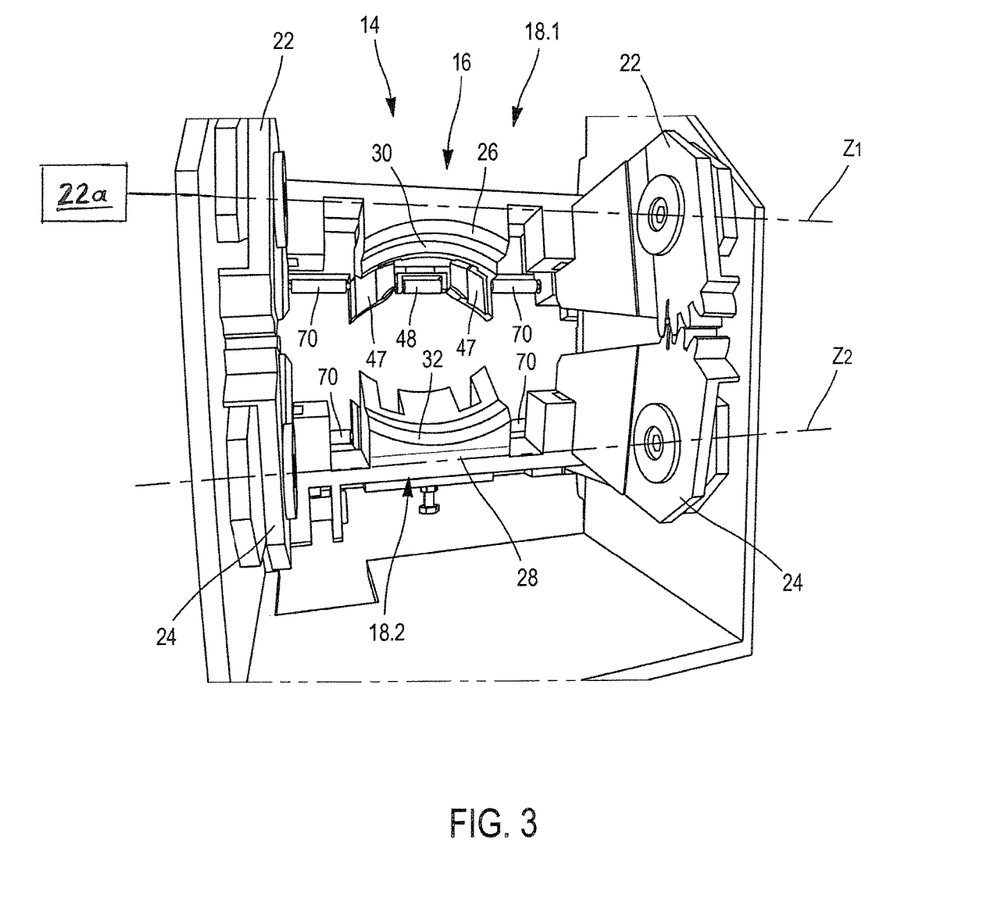
FIG. 3 is a rear view of the device of FIG. 2.
Figure 4:
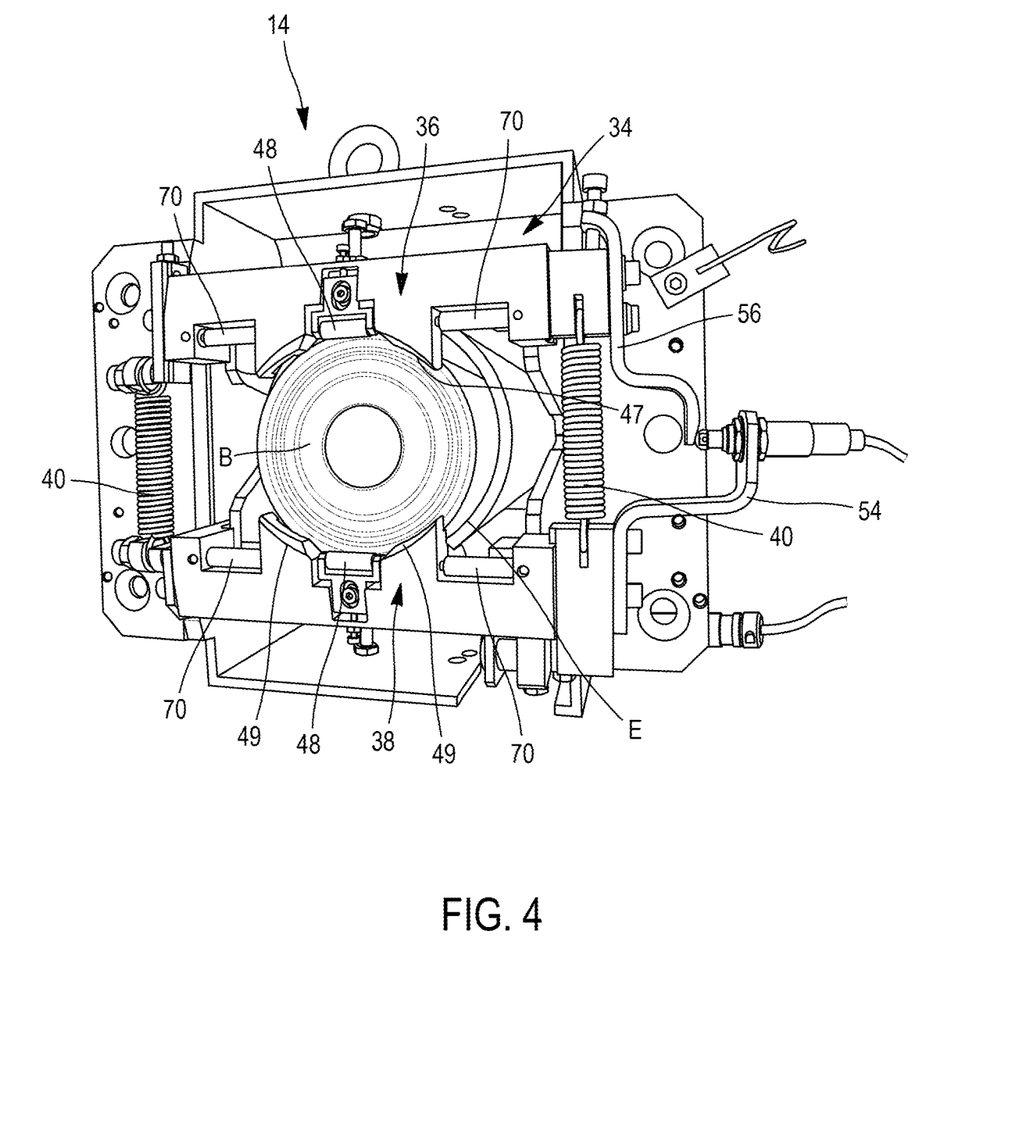
FIG. 4 is a front view similar to that of FIG. 2, a case and a box being in place.

The holding device 14 is shown in FIGS. 2, 3 and 4.

This holding device 14 will now be described more precisely.

FIGS. 2 and 3 show a front view and a rear view respectively of the holding device alone arranged outside the wheel 6.

The holding device comprises clamping means 16 of the case. The clamping means 16 comprise an upper jaw 18.1 and a lower jaw 18.2 (FIG. 3). The upper 18.1 and lower 18.2 jaws are mounted articulated on a frame 20.

In the example shown, the upper jaw 18.1 comprises two flanges 22 extending parallel to the axis Y of the housing 8. Each flange is mounted articulated on the chassis 20 about the axis Z1. The lower jaw 18.2 in turn comprises two flanges 24 extending parallel to the axis Y and articulated in rotation on the frame 20 about an axis Z2 parallel to the axis Z1.

Each jaw 18.1, 18.2 comprises clamps 26, 28 respectively extending between the two flanges 22, 24 respectively and intended to clamp the case. In a closing position of the jaws 18.1, 18.2, the two clamps 26, 28 delimit a housing corresponding to the outer section of the case.

The holding device 14 also comprises actuation means of the jaws 18.1, 18.2 so as to cause their closing in or their distancing by pivoting about the axes Z1, Z2 respectively. In the example shown and very advantageously, the flanges 22 and 24 of the upper and lower jaws comprise teeth meshing with each other such that rotation of one of the jaws in one direction causes rotation of the other of the jaws in the opposite direction, ensuring the closing or opening synchronisation of the jaws 18.1, 18.2. In the example shown, the flanges of the upper jaw 18.1 comprise four teeth meshing with three teeth of the flanges of the lower jaw 18.2.

This embodiment has the added advantage of simplifying the device since it now comprises only a single actuator 22a for moving the two jaws 18.1, 18.2 simultaneously. For example, displacement of one of the jaws is done by means of a single electric motor 22a by means of a connecting rod articulated on one of the flanges. Alternatively, a motor for each of the jaws could be utilised for actuating each of the clamping jaws 18.1 and 18.2, the actuation of the two motors being synchronised.

Highly advantageously, the clamp 26 of the upper jaw 18.1 comprises a shoulder 30 forming a longitudinal stop for the case. The clamp of the lower jaw 18.2, as such, advantageously comprises a chamfer 32 for guiding the boxes exiting from the case. This embodiment using a longitudinal stop on one of the jaws and a guide on the other jaw allows considerable reliability in evacuation of the boxes and avoids any risk of wedging due to default of geometry or dimensioning of the jaws.

The holding device 14 also comprises means forming a longitudinal stop for the boxes contained in the case. These means designated 34 comprise an upper jaw 36 and a lower jaw 38, and these jaws shall be designated stop jaws. The stop jaws 36, 38 are supported by the upper 18.1 and lower 18.2 jaws such that they are arranged downstream from the jaws 18.1, 18.2 in the direction of evacuation of the boxes contained in the case along the axis Y. The stop jaws 36, 38 are mounted articulated on the frame 20 about the axes Z1 and Z2 respectively as the upper 18.1 and lower 18.2 jaws.

The stop jaws 36, 38 are mounted in a free manner on the upper 18.1 and lower 18.2 jaws, such that the stop jaws 36, 38 can be moved apart from each other by pivoting about the axes Z1 and Z2 independently of the jaws 18.1 and 18.2.

The stop jaws 36, 38 together delimit passage of substantially circular form 47 whereof the diameter is slightly less than the external diameter of the boxes as seen in FIG. 4. In a state ensuring passage of the boxes, the passage has a diameter slightly larger than the external diameter of the boxes.

The stop jaws 36, 38 are brought in towards each other by resilient means 40 arranged laterally on either side of the passage of the boxes between the jaws. In the example shown, these resilient means 40 are formed by helicoidal springs connecting the stop jaws 36, 38.

Highly advantageously, adjustment means of the tension of the springs 40 are provided. For this, the adjustment springs are mounted on each stop jaw by a piece 44 articulated on the stop jaws about axes Z3 and Z4 parallel to the axes Z1 and Z2 and an adjusting screw 46 is provided for modifying the tension of the springs.

The stop jaw 36 comprises two clamps 47 defining an arc of a circle and the stop jaw 38 also comprises two clamps 49 in the form of an arc of a circle. Highly advantageously, each of the jaws 36, 38 comprises between its two clamps a roller 48 for guiding and rolling boxes during their extraction. Each roller 48 is mounted in a free manner in rotation about an axis parallel to the axes Z1 and Z2.

Highly advantageously also, the stop jaws 36, 38 are intended to be moved away from each other by means of an external device which will be described hereinbelow, this external device also being intended to simultaneously recover the boxes evacuated from the case.

In the example shown and advantageously, the holding device 14 comprises detection means of the position of the stop jaws 36 and 38 relative to each other. Advantageously, these detection means comprise a single sensor 52 measuring the relative position of the two stop jaws 36 and 38. In the example shown, the sensor 52 is mounted on an arm 54 secured in movement with the stop jaw 38 and cooperating with an arm 56 secured in movement with the stop jaw 36. This sensor 52 is advantageously mechanical only, reducing the risk of failure relative to an electronic sensor, especially in a glove box of a nuclear fuel manufacturing installation.

As a variant, a sensor could be provided on the lower stop jaw 38 and a sensor on the upper stop jaw 36, and measurements could be compared to determine the relative position of the stop jaws 36 and 38.

As for detection of the positions of the clamping jaws 18.1 and 18.2 of the case, this can be done directly at the level of the electric motor moving at least one of the two jaws 18.1, 18.2. Sensors supported by the clamping jaws could be provided as a variant.

Figure 5:
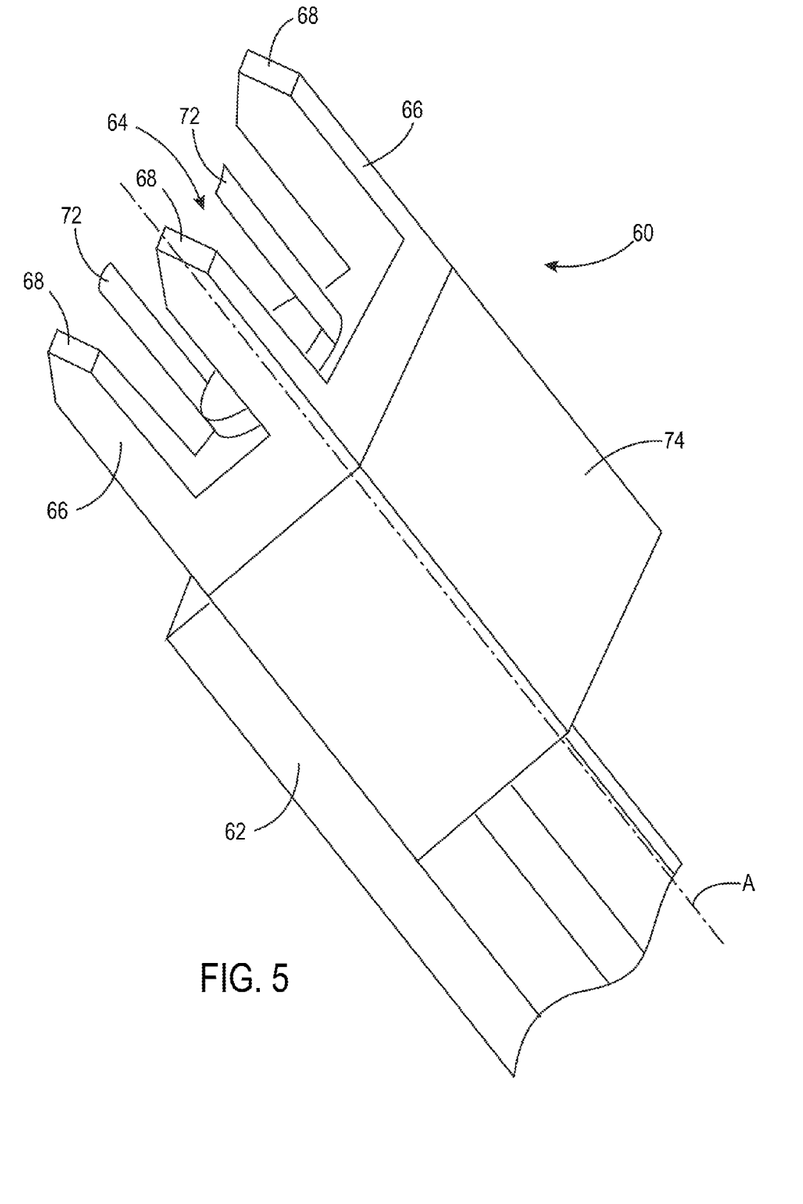
FIG. 5 is a schematic representation of the device for retrieval of boxes contained in the case.

The device for opening the stop jaws and retrieval of the boxes by means of the schematic representation of FIG. 5 will now be described.

As seen hereinbelow, the boxes are advantageously evacuated by gravity. The device for retrieval 60 comprises an arm 62 articulated in rotation about a horizontal axis by a first end and comprising at a second end a receiving housing 64 of boxes evacuated from the case. This end also comprises opening means of the stop jaws 36, 38 formed by four fingers 66. These four fingers are intended to cooperate with the faces opposite the jaws 36, 38 and to cause them to move away from each other by distancing from the axis Y so as to widen the passage delimited by the clamps of the stop jaws 36, 38.

For this, the fingers comprise free ends 68 fitted with an inclined face—also called ramps 68—such that their longitudinal penetration along the axis Y between the stop jaws 36, 38 causes the stop jaws to move apart on meeting the force exerted by the springs 40. Highly advantageously, each jaw 36, 38 comprises two rollers 70 on either side of the clamps 47, 49 intended to cooperate with the inclined ends of the fingers 66 such that these ends 68 roll on the rollers 70. This embodiment has the advantage of avoiding wedging and reduces wear on fingers and stop jaws 36, 38.

The device for retrieval also comprises a gripper 72 which recloses when it is detected that the box is now in the housing.

Advantageously, a sensor is provided in the housing for determining the presence or not of the box. Advantageously, the housing is supported by a mobile trolley 74 along the axis A of the arm, which allows the box contained in the housing to move and to move it towards a storage trolley (not shown) for example for a weighing step of the box and/or for a following opening and emptying step for the manufacture of nuclear MOX fuel.

For example, the gripper is controlled by means of a jack and the trolley is moved by a motor of screw type.

The different stations of the handling and management installation of the case containing the boxes in relation to FIG. 1 will now be described.

The installation contained in the glove box 2 comprises different stations distributed about the wheel 6. It comprises a device for opening 75 the case, comprising cutting means of an end of the case, this cutting device is for example that described in document FR 2 682 902. It comprises a cutting wheel mounted in rotation and which will cut out the circumference of the tube.

The wheel 6 advantageously comprises a system of longitudinal displacement along the axis Y of the case, which is utilised to cut out the case, placing the case such that its end intended to be cut out projects from the wheel 6 and can be cut out by the cutting wheel. Advantageously, the cutting device is arranged vertically above the wheel at an angular position of 90° relative to the position of introduction of the case in the wheel 6. The installation also comprises the device for retrieval 60 of boxes. Advantageously, the latter is arranged below the wheel 6 such that the housing is oriented at 45° relative to a horizontal axis, which ensures evacuation by gravity of boxes contained in the case.

The installation can also comprise a device for retrieval 76 of the case body when the latter has been entirely emptied of its boxes. In the example shown, the latter is arranged below the wheel 6 such that the axis Y of the housing 8 is oriented vertically.

The different steps for handling and emptying a case from its introduction to the glove box 2 to its evacuation in the retrieval device 76 will now be described.

As described previously, the case E is introduced to the glove box 2 in a horizontal position, the wheel 6 is oriented such that the axis Y of the housing 8 as also at the horizontal.

The case E closed is introduced to the housing 8 for example by means of a pusher (not shown). For this, the jaws 18.1 and 18.2 have been previously moved away so as to create a passage sufficient for passage of the case. Due to the structure of the holding device 14, the stop jaws 36 and 38 are also moved away, leaving free passage for the case E. When the case E is in place in the housing 8, the jaws 18.1, 18.2 are reclosed holding the case E clamped.

The wheel 6 is then pivoted by an angle of 90° in an anticlockwise direction such that the holding device 14 is arranged in the upper part of the wheel 6 opposite the cutting device. The closed end of the case E located to the side of the holding device 14 will then be cut out. For this, the clamping jaws 18.1, 18.2 are moved away from each other also causing opening of the stop jaws 36, 38. The displacement device 78 along the axis Y moves the case which will be moved upwards, causing the end of the case intended to be cut out to come out. The end of the case intended to be cut out is placed in the cutting device. The cutting device is actuated when proper positioning of the case E is detected. The cutting wheel cuts out the tubular periphery of the case E so as to separate a head of the case from the body of the case which contains the boxes. The head of the case separated from the body of the case is retrieved, for example by means of a grasp and is then evacuated.

When the cut is completed, the displacement device 78 along the axis Y lowers the body of the case into the housing 8, and the clamping jaws 18.1 and 18.2 are reclosed, again causing clamping of the body of the case, the shoulder formed in the upper jaw 18.1 forming a stop for the open end of the body of the case. The stop jaws 36 and 38 form a longitudinal stop along the axis Y for the boxes B which are now accessible via the open end of the body of the case (FIG. 4).

During a following step, for the evacuation of the boxes contained in the body of the case, the wheel 6 pivots about its axis in the direction of the device for retrieval of the boxes. In the example shown, the wheel pivots by an angle of 135° in the anticlockwise direction so as to orient the axis Y of the housing according to an axis of 45° relative to the horizontal. The arm of the retrieval device is oriented such that its axis A is substantially aligned with the axis Y of the housing 8. Next, the trolley bearing fingers 66 moves along the axis A in the direction of the holding device 14; the fingers penetrate between the two stop jaws 36 and 38, and the inclined ends or ramps 68 of the fingers slide along rollers causing the stop jaws 36 and 38 to move apart without causing opening of the clamping jaws 18.1, 18.2. The passage delimited by the clamps of the stop jaws 36 and 38 is sufficient to allow passage of a box B. In addition, because of the inclination towards the bottom of the housing 8, the box B slides naturally by gravity towards the housing of the retrieval device. The retrieval device then takes away the box which it has just retrieved for example towards a weight balance. A transfer device is provided to unload the box from the trolley and place it on the balance.

When it has been unloaded from the box, it is returned to position for evacuating another box. These operations are repeated until the case is empty. Next, the wheel 6 pivots by an angle of 45° in the anticlockwise direction to position the axis Y of the housing 8 vertically, and its opening oriented downwards, opposite the retrieval device of the case body. Since the opening of the clamping jaws 18.1, 18.2 is actuated by means of the electric motor, the stop jaws 36, 38 open simultaneously.

The body of the case is released and, because of the force of gravity, falls into the retrieval device of the case body. This device can be formed for example by a basket intended to retrieve several case bodies. Similarly, as for the case heads, the retrieval device of the latter can be formed by a basket taking up several case heads. When the baskets of case heads and case bodies are full, the latter are evacuated for processing.

It is feasible to open the case before its introduction to the wheel, the wheel merely acting to extract the boxes one by one. This variant is more adapted to handling objects needing no confinement.

This handling and management device for cases containing boxes is particularly robust as it is entirely mechanical. Also, it can comprise a reduced number of actuators since a single actuator is sufficient to control the holding device. Also, it is very reliable, with the cases being held by clamping and a longitudinal stop being provided, which avoids any risk of the case escaping from the wheel and makes evacuation of boxes easy.

Also, handling cases and boxes is done with much caution, with the boxes not undergoing any great shock. The risk of deterioration to the boxes is therefore considerably reduced and therefore handling safety is ensured.

The handling device according to the invention can consequently be applied in technical fields where handling and transfer of fragile objects are required.

What is claimed is:

1. A handling device for at least one case and at least one object contained in the at least one case, the at least one case being of cylindrical form, said device comprising:
a housing of longitudinal axis configured to receive the at least one case, said housing being closed at a first longitudinal end and open at a second longitudinal end,
a holder mounted at the level of the second end of the housing, said holder comprising two clamping jaws capable of being moved about an axis of rotation which is orthogonal to the longitudinal axis of the housing, said clamping jaws being configured to apply a clamping force to the at least one case so as to hold the at least one case longitudinally in the housing, at least one actuator for opening and closing said clamping jaws, two stop jaws, each of said stop jaws being supported by one of said clamping jaws and being configured to rotate about the axis of rotation of the clamping jaw, said stop jaws being moved towards each other in a stop position by resilient means, such that the opening of the clamping jaws causes opening of the stop jaws and such that the stop jaws can be opened independently of the clamping jaws, said stop jaws being located outside the housing and downstream the clamping jaws and being configured to stop the at least one object at the second longitudinal end of the housing.

2. The handling device according to claim 1, comprising a wheel rotatably mounted about its axis, said housing being arranged in said wheel and extending along a diameter of said wheel.

3. The handling device according to claim 1, wherein one of the clamping jaws comprises a shoulder forming a longitudinal stop for the at least one case.

4. The handling device according to claim 3, wherein the other clamping jaw comprises a face inclined relative to the axis of the housing towards the exterior of the housing.

5. The handling device according to claim 1, wherein at least one of the stop jaws comprises a roller free in rotation bordering a passage delimited by the two stop jaws so as to make it easy to take out the object contained in the at least one case.

6. The handling device according to claim 1, wherein each stop jaw comprises opening faces on either side of a passage delimited by the two stop jaws, said opening faces of one of the two stop jaws being opposite the opening faces of the other stop jaw, said opening faces each being configured to cooperate with ramps supported by an opening device.

7. The handling device according to claim 6, wherein said opening faces each comprise a roller free in rotation cooperating with one of said ramps.

8. The handling device according to claim 1, comprising at least one sensor for measuring the position of the stop jaws.

9. The handling device according to claim 8, wherein the at least one sensor comprises a single sensor measuring the relative position of the stop jaws, said sensor being supported by an arm secured in movement with one of the stop jaws and being sensitive to displacement of another arm secured in movement with the other stop jaw.

10. The handling device according to claim 1, comprising an actuator for rotatably moving one of the clamping jaws and a transmitter for transmitting movement to the other clamping jaw so as to cause the clamping jaws to move away or come more closely.

11. The handling device according to claim 10, wherein the clamping jaws comprise two lateral flanges articulated on a frame of the handling device, and wherein the transmitter are formed by teeth supported by each lateral flange, said teeth meshing such that the rotation in one direction of one of the clamping jaws causes rotation in a direction opposite the other clamping jaw.

12. The handling device according to claim 1, wherein the resilient means bringing the stop jaws back comprise two helicoidal springs arranged on either side of the longitudinal axis of the housing, each helicoidal spring being fixed by one end to one of the two stop jaws and by another end to the other stop jaw.

13. The handling device according to claim 12, comprising an adjuster for adjusting the tension of the springs.

14. The handling device according to claim 1, comprising a device for displacement of the at least one case along the longitudinal axis of the housing arranged in the housing.

15. An installation for handling at least one case and at least one object contained in the at least one case, the installation comprising a handling device according to claim 1, a device for opening the at least one case and make the at least one object contained in the at least one case accessible, and an extraction and retrieval device for extraction and retrieval of the at least one object contained in the at least one case.

16. The installation according to claim 15, wherein the handling device comprises a wheel rotatably mounted about its axis, said housing being arranged in said wheel and extending along a diameter of said wheel and wherein the device for opening the at least one case and the device for extraction and retrieval of the at least one object contained in the at least one case are arranged about the wheel.

17. The installation according to claim 16, wherein the device for opening the at least one case is a cutting device arranged above the wheel and the device for extraction and retrieval is arranged below the wheel such that the extraction of the at least one object from the body of the at least one case is achieved by gravity.

18. The installation according to claim 17, wherein, during extraction of the at least one object, the longitudinal axis of the housing is oriented at an angle of 45° relative to a horizontal direction.

19. The installation according to claim 15, wherein the extraction and retrieval device comprises an arm of longitudinal axis is placeable at least in rotation about an axis parallel to the axis of the wheel, a trolley movably mounted in translation on the arm along the longitudinal axis of the arm, a housing supported by the trolley intended to receive the at least one object contained in the at least one case, and opening means of the stop jaws.

20. The installation according to claim 19, wherein the opening means of the stop jaws comprise four fingers supported by the trolley and bordering the housing, said fingers being oriented parallel to the longitudinal axis of the arm and each being fitted at a free end by a ramp configured to cooperate with the stop jaws such that when the fingers are inserted between the stop jaws, the latter move away from each other.

21. The installation according to claim 19, wherein the trolley comprises detection means of the presence of the object.

22. The installation according to claim 16, comprising a device for retrieval of the at least one empty case, arranged under the wheel such that evacuation of the at least one empty case body is achieved by gravity and a device for retrieval of the at least one case heads.

23. The installation according to claim 15, wherein the at least one object is a box containing plutonium oxide and said installation is confined in a glove box.

* * * * *